Sept. 15, 1964 V. R. CAMPBELL 3,148,901
METAL SEAL FITTING AND METHOD
Filed June 5, 1963 2 Sheets-Sheet 1
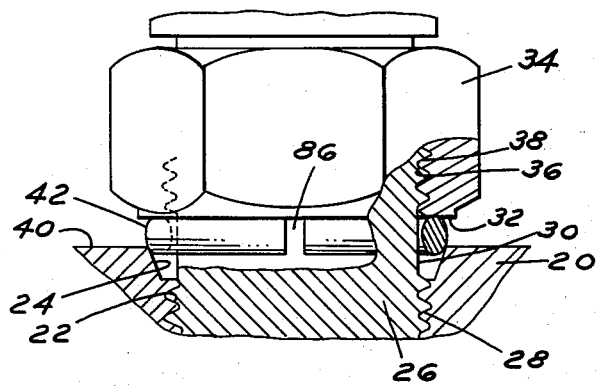
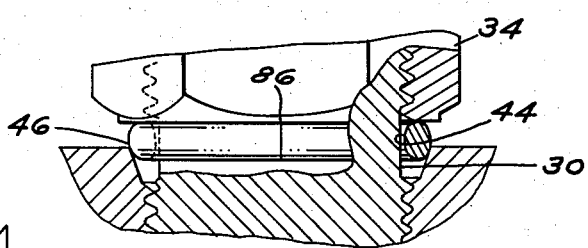
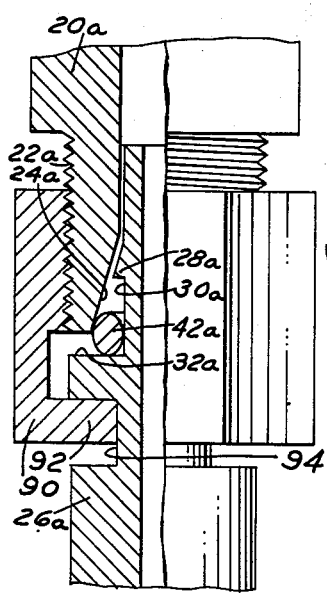
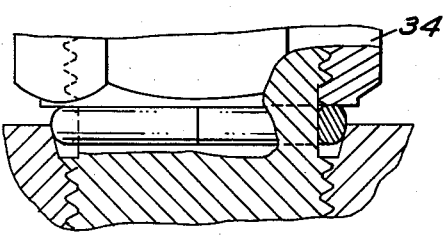
INVENTOR.
VERNON R. CAMPBELL
BY
*Burton & Parker*
ATTORNEYS

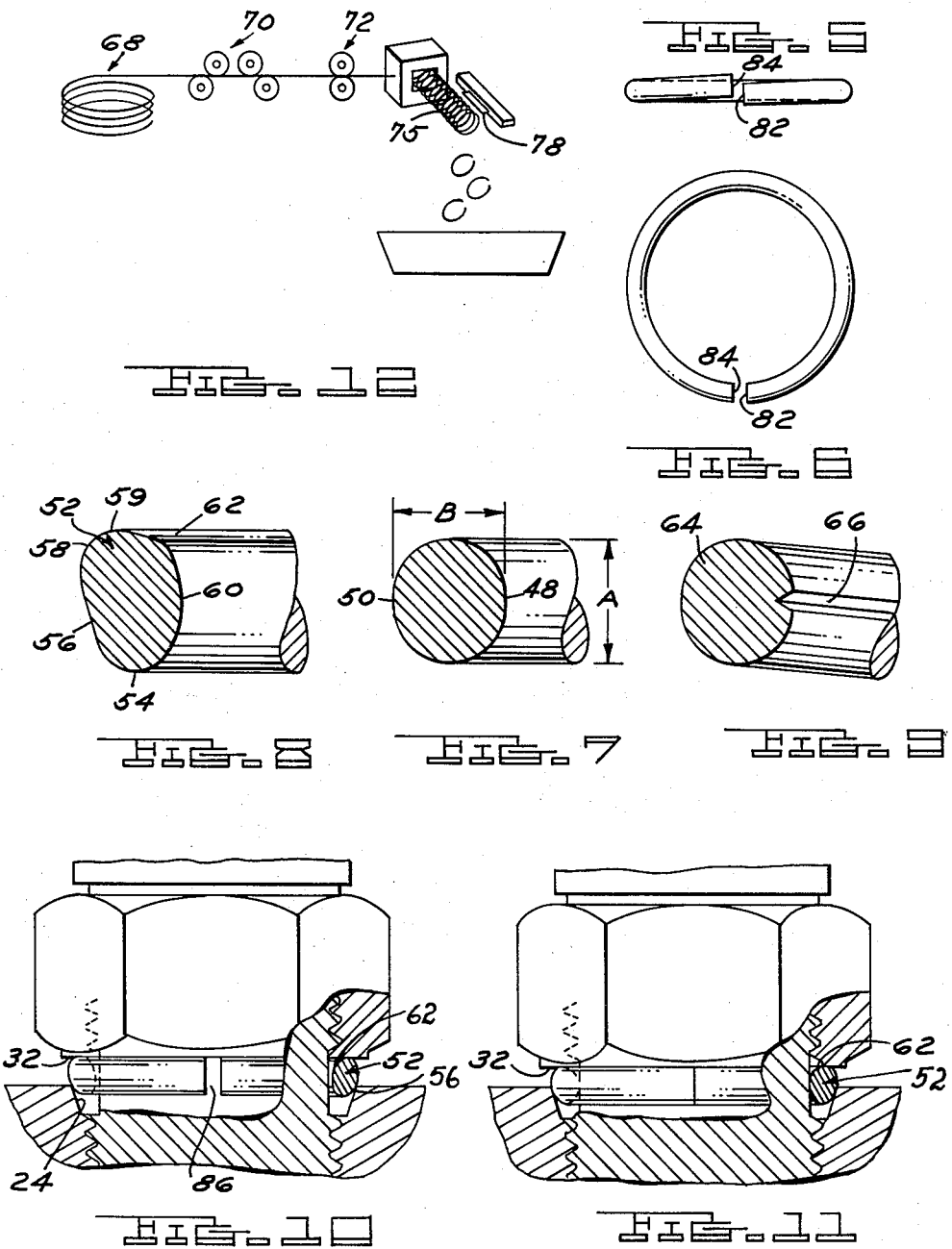

United States Patent Office 3,148,901
Patented Sept. 15, 1964

3,148,901
METAL SEAL FITTING AND METHOD
Vernon R. Campbell, Berkley, Mich., assignor to L & L Manufacturing Company, Warren, Mich., a corporation of Michigan
Filed June 5, 1963, Ser. No. 285,824
9 Claims. (Cl. 285—212)

This invention relates to a fluid pressure coupling or fitting, such as a static port seal tube fitting, characterized in that the fluid seal is established between the coupling and the port by a metal sealing ring which is severed or split through at one end of a diameter of the ring. Though one might expect that such a ring would allow leakage of fluid at the split, at least at higher pressures, it has been found that when constructed according to the teaching herein disclosed, fittings equipped with such rings will not only hold fluid pressures as high as those currently held by competitive high pressure fittings, but in some cases substantially in excess thereof, and in all cases without the attendant disadvantages of the prior art fittings. While the use of various types of split rings has been suggested in the prior art for purposes of sealing, to my knowledge none have been designed, nor would any I have seen be suitable, for use as a static port seal subject in many instances to high fluid pressures (over 15,000 p.s.i.) and the various frequencies and severities of vibration, ease of installation and reuse required in the present-day fluid pressure systems.

Currently there are two principal forms of sealing rings in commercial use for effecting the fluid tight seal in a static port seal fitting, either of which is superior to any prior art split ring of which I am aware. The one most widely used is the rubber-like O-ring seal which encircles the "groove" of the fitting and is entrapped in the beveled mouth of the port. The other form of seal is of more recent appearance and comprises a continuous metal ring which is urged against the beveled mouth of the port and radially inwardly against the surface of the "groove" to bridge and seal the gap therebetween. A number of patents show the O-ring seal and U.S. Patents 3,003,795 and 3,079,180 are exemplary of metal ring seals.

An object of this invention is the provision of a static port seal fitting characterized by a metal split ring seal which is not subject to the disadvantages of either the conventional O-ring or continuous metal sealing ring, and possesses a number of positive advantages over either of these types of seals.

Another object of the invention is the provision of a metal ring seal which may be readily substituted "in the field" for an O-ring seal on a fitting in which the O-ring for any one of a variety of reasons fails to satisfy service requirements.

A fitting provided with a split ring seal of the character disclosed herein possesses the following advantages over a fitting having the conventional O-ring seal: because the new ring is not subject to being extruded by fluid pressure out of the port as is an O-ring, the fitting does not require any special extrusion preventive means for preventing extrusion of the sealing ring as does a fitting provided with an O-ring; as the ring serves itself to limit the amount the fitting is tightened into the port, the number of pounds of torque applied to the fitting is directly related to the tightness of the seal; as the seal is reusable many times without replacement, use of the fitting in the field is facilitated; as the seal will withstand higher and lower temperatures, fittings equipped with such seals are usable over a correspondingly wider range of temperatures; fittings equipped with this sealing ring will withstand without loosening much more severe vibration; for the same torque, a fitting equipped with this sealing ring will hold a greater fluid pressure though the fitting be made of softer steel than a corresponding O-ring fitting; a fitting designed for use with a split metal ring of the type disclosed herein is cheaper to produce than a comparable O-ring fitting; one type of sealing ring material will be satisfactory for the majority of fluid applications while a variety of O-ring materials would be required for the same range of fluid applications; better performance is obtained using a metal split ring of the character herein disclosed on an O-ring fitting than the O-ring designed for use with the same fitting; and a split ring can be used to replace an O-ring in virtually every port static seal installation and do a better job at a lesser cost.

As compared with the continuous metal sealing ring, the split ring possesses the following advantages: it is cheaper to produce than a continuous ring; a wider range of materials is available from which the ring may be formed because there is not the concern for machinability existing with the continuous ring; it seals at a lower torque; fitting bodies may be softer as less torque is required to effect a seal; fitting bodies need not be designed to withstand swaging of the ring thereabout as is necessary with a continuous metal seal; at a given torque the split ring will hold a greater fluid pressure without leakage; cost of producing the fitting utilizing a split ring is less because for one, among many reasons, there is no necessity to swage the ring upon the fitting; the split ring may be readily replaced in the field while such is not true of the continuous ring.

In addition, the split ring may be installed in the field on an O-ring fitting, without modification of the fitting to replace an O-ring which for some reason does not meet service requirements.

Despite the previous efforts of others for almost seventy-five years, as exemplified by the following U.S. patents: 392,931, issued in 1888; 1,387,901, issued in 1921; 1,583,126, issued in 1926; 2,064,140, issued in 1936; and 2,347,469, issued in 1944, there has never been a commercially successful, nor so far as I know, satisfactory fluid pressure tube fitting which would withstand high fluid pressures, that is over 10,000 p.s.i., utilizing a single metal ring split through at one end of its diameter, and which would excel in performance and reliabiilty the O-ring or the continuous metal sealing ring for static port seal fittings.

In view of the fact that a metal split ring of the character herein disclosed may be readily substituted in substantially all static port seal fitting applications for the conventional O-ring or continuous metal ring currently in widespread use, and as the disadvantages attending the use of an O-ring and continuous metal sealing ring are not present with the split ring, and certain other positive advantages are attained, I anticipate a substantial displacement of the O-ring and continuous metal ring in static port seal fittings by the herein described split ring.

The history of the prior art leading up to the concepts herein set forth is marked by two well-defined steps, first the resilient O-ring seal, and second the relatively rigid, relatively non-resilient, continuous metal ring seal. Despite its many advantages over the O-ring seal, the continuous metal ring seal faces two major drawbacks. It is relatively expensive to make and is difficult to assemble on the fitting in comparison with the ease with which an O-ring can be installed. S.A.E. standards are in part responsible for this difficulty. Therefore I gave long and serious consideration to the provision of a metal ring seal which could be produced as/or more cheaply than the O-ring and which could be as/or more easily installed than the O-ring.

Working with the standard S.A.E. 15 degree port and a fitting body designed for a continuous metal ring seal which also met S.A.E. standards, the apparently foolish expedient of utilizing a split metal ring was tried and despite preconceived, and apparently erroneous, assumptions that such a sealing ring would leak, on the contrary was found to withstand pressures as great as those withstood by O-rings and continuous metal ring fittings. Subsequent experimentation developed the critical considerations in the concept which are set forth hereinafter.

FIG. 1 is a cross-sectional view through a fluid pressure coupling screwed "finger-tight" in a port and embodying the invention;

FIG. 2 is a cross-sectional view similar to FIG. 1 but wherein the coupling has been further tightened into the port to initially close the split in the sealing ring;

FIG. 3 is a cross-sectional view similar to FIGS. 1 and 2 but wherein the coupling has been fully tightened into the port to effect a fluid-tight seal between the coupling and port;

FIG. 4 is a view partially in section of a modified form of assembly embodying the invention;

FIG. 5 is an edge elevation of a split ring usable in the invention;

FIG. 6 is a top view of the ring of FIG. 5;

FIG. 7 is a cross-sectional view through a ring of the character herein described showing one form of cross-sectional configuration;

FIG. 8 is a cross-sectional view through a ring of the character herein described showing another cross-sectional configuration;

FIG. 9 is a cross-sectional view through a split ring of the character herein described showing still another cross-sectional configuration;

FIG. 10 is a cross-sectional view through a fitting mounted in a port in which a ring of the cross-sectional configuration of FIG. 8 is utilized, showing the parts in an initial stage of sealing assembly;

FIG. 11 is a cross-sectional view similar to FIG. 10 showing parts in final stage of sealing assembly; and FIG. 12 is a schematic illustration of the method of forming the split ring disclosed herein.

FIGS. 1–3 inclusive show a fitting at various stages of assembly in a port, such fitting utilizing the split sealing ring. The member 20 to which the fitting is to be connected is provided with an outwardly opening port having internal threads 22 and an unthreaded beveled entrance 24. The entrance is shown as having a beveled angle of 15 degrees (from the axis of the port). The split ring has been found to work well with bevel angles of from 10 degrees to 60 degrees. S.A.E. standards prescribe an 11 to 16 degree port depending upon the size of the fitting. The port threads are preferably straight rather than tapered such as self-sealing pipe threads. The member 20 is formed of metal of a hardness preferably at least equal to that of the fitting body 26. Any metal of a strength equal to that of cast iron or high strength aluminum may be used for the port member. The beveled surface should be finished smooth, the smoothness being at least 100 microinch or better.

The fitting body 26 may be made of a relatively low priced screw machine steel, and is provided with an externally straight threaded length 28 for screw-threaded reception in the port. The body is, of course, provided with an axial passageway therethrough, not shown, for conducting fluid pressure into or out of the member 20. At the outer end, i.e., in a direction moving outwardly of the port, the threaded length 28 of the body is provided with an annular unthreaded length 30 which is referred to in the trade as a "groove," and which should have a surface finish of at least 64 microinch or better. Its diameter is substantially equal to the root diameter of the threaded length 28. At the outer end of the groove is a radially extending annular compression shoulder or face 32 which may either be integral with the body 26 such that it moves toward the port simply by threading the fitting into the port, or which is, as in the embodiment shown, the lower end of a compression nut 34 which is threaded onto the fitting body for movement toward and away from the port while the body is held against rotation. The nut may be formed of the same type material as the body 26.

The face 32 is shown lying substantially perpendicular to the surface of groove 30. Such face may lie within a range of acute angles with respect to the surface of the groove 30, from 90 degrees as aforesaid to 30 degrees. With a port angle of approximately 17 degrees as shown in FIG. 1, it is preferable that face 32 lie near the larger angle end of its range, while as the angle of port 24 increases, the angle of face 32 may decrease. This is so because it is desirable to provide a fairly large resultant of forces tending to radially contract the ring as the face 32 moves toward the port urging the ring against the beveled surface of entrance 24 to insure that the split in the ring is closed fluid tightly and to insure that a complete circumaxial seal is formed between the ring and the groove surface. When the port angle is relatively steep as shown in FIG. 1, and face 32 is substantially perpendicular to groove 30, the resultant force tending to contract the ring is quite large with a given torque on the nut 34. As the port angle 24 becomes larger the resultant contracting force on the ring decreases with the same torque on the nut if the face 32 is perpendicular to the groove surface. However, if face 32 is formed on a more acute angle, then the resultant contracting force on the nut increases. On the other hand, it is necessary that a substantial axial loading also be maintained as between the ring and the beveled port entrance. Therefore to accommodate the various port angles I have determined that the angle between the face 32 and the beveled entrance of the port should preferably not exceed 90 degrees and preferably not be less than about 75 degrees, 80 to 90 degrees being the preferred range. On the other hand I have successfully sealed fittings in the so-called AND 10050 port having a 60 degree bevel where the compression face of the nut was perpendicular to the groove surface.

A compression nut 34 is generally used where the fitting body 26 is of an elbow shape and it is desirable to be able to position the elbow in the port for connection with other piping and while holding it in such position tighten the compression nut to effect the seal. Generally the face 32 is integral with the body 26 when the fitting is of the straight type and there is no need to rotationally orient the fitting in any particular position before effecting the seal.

The nut 34 is internally straight-threaded as at 36 while the fitting body is externally straight-threaded as at 38. The diameter of the groove 30 is substantially equal to the root diameter of the threads 38.

It will be noted that the face or shoulder 32 cooperatively with the surface of the groove 30 and the surface of the beveled port 24 form a chamber or recess which is substantially closed on all sides except for the space between the face 32 and the upper surface 40 of member 20 surrounding the port opening. Within this chamber the sealing is effected. While the outer end of this chamber, i.e., the end at the surface 40 surrounding the port is wider than the inner end of the chamber, it is not sufficiently wider so that the fitting designer has very much latitude in the design of the sealing means for effecting the seal; that is to say, the cross-section of the seal must substantially fill the space at the outer end of the chamber prior to tightening the fitting into the port because there is little room for movement of the ring to contract fluid tightly about the groove 30 during axial movement into the port.

The split ring itself, indicated in FIGS. 1–3 at 42 is of solid cross-section and approaches the shape of an ellipse. This shape and the shapes of the other rings disclosed herein are based on the following factors which I believe are critical:

(1) The ring should present to the groove surface 30 and the beveled entrance 24 rounded surfaces or surfaces formed on large radii which will not significantly penetrate or cause permanent deformation of the groove and port surfaces. A surface with a comparatively large radius of curvature can compensate more readily for slight misalignments or eccentricity between the fitting body and port than flat surfaces with sharp corners. Flats, such as surfaces 48, 50 and 56 of FIGS. 7 and 8, are satisfactory provided they blend smoothly with the curved surfaces adjacent them.

(2) A ring more nearly circular in cross-section can withstand higher loads than a slender oblong form in which the load is transmitted in the direction of the longer dimension.

(3) The sealing section of the ring should fit well within the annular space between the tapered port surface and the groove surface.

(4) When the fitting body and ring are tightened into the port, surface 32 must be spaced far enough from the surface 40 surrounding the port to allow room for the tightening to an initially sealed condition, and thereafter further tightening if desired.

These factors are best satisfied by the use of a ring which is slightly oblong or approximately elliptical in cross-section. In this respect the ratio of the axial dimension A, see FIG. 7, termed herein thickness, to the radial dimension in cross-section B, termed herein width, is of considerable importance. The best ratio of B to A lies in the range of values of from .7 to .85 approximately, though a range of values of from .25 to 1 is possible and in some circumstances practicable.

While I have spoken of curvature in the sealing surfaces of the ring, actually in the ideal shape the ring should exhibit curved surfaces immediately adjacent the circumferential inside and outside lines of fluid sealing contact with the groove and port surfaces, with the surface of the ring actually effecting the seal being a smooth transition surface connecting such curved surfaces. Such transition surface is indicated in FIG. 2 at 44 on the inside surface of the ring and at 46 on the outside surface. In FIG. 7 a split ring more closely approaching a circular cross-section than the ring of FIGS. 1–3, exhibits transition surfaces 48 and 50.

In FIG. 8 a split ring 52 is shown in fragmentary cross-section of an irregular shape which must be used with the lower end 54 extending down into the port. The external surface has a transition surface portion at 56 which smoothly connects the upper curve 58 with the lower curved end 54. The inside surface is curved at 60 from a flat 62 down to the curved lower end 54.

The ring 64 of FIG. 9 is similar to that of FIG. 7 except that ring 64 is provided on its inner surface with a thread groove 66 enabling the ring to be threaded onto the fitting body over the threads 28 to seat it about the groove 30.

FIGS. 5 and 6 show in edge and plan views respectively a typical outline of a ring which may be of a cross-section corresponding to either that of FIGS. 1–3, 7, 8 or 9. The formation of the ring is shown schematically in FIG. 12. Wire or rod is used. It may be taken from a coil 68 and straightened at 70, passed through a rolling machine 72 which shapes and sizes it in cross-section, and thence to a coiling machine 74 where it is coiled as at 75 and thereafter cut longitudinally as by a saw 78. Upon cutting, the convolutions may tend to open slightly and adjacent ends of each convolution may tend to spring into disaligned spaced-apart registration as shown in FIG. 5. The cutting of the coil 75 by saw 78 should be such that the end faces 82 and 84 are smooth and parallel and have a surface finish of 32 microinch or better. I have found that a surface finish lying within the range of from 16 microinch to 32 microinch is quite satisfactory, particularly in the use of rings formed of aluminum as herein described. Where the rings are formed of stainless steel, the finish of the faces 82 and 84 must be closer to the 16 microinch smoothness and surface finish of the groove and port must also be somewhat smoother.

Except for ring 64, the rings are placed on the fitting by radially expanding them sufficient to slide them over the threaded length 28 of the fitting body to circularly embrace the groove. Upon release from such radial expansion the ring contracts about the groove to be captive thereon, the thread 28 acting as an abutment.

In FIG. 1 a fitting body with a split ring thereon is shown screwed "hand tight" into the port. The face 32 in cooperation with the beveled surface 24 has drawn the ends of the ring at the split into spaced-apart registry. As the nut 34 is tightened, the ring is urged downwardly into the port until the split 86 is closed, the end faces 82 and 84 being then in abutment. Ideally to insure a proper seal, the split 86 should initially close while the inside circumferential surface 44 of the ring is still spaced slightly from the groove surface. In FIG. 2 the split 86 is shown closed while surface 44 is spaced by, for example, .003 inch from the groove surface 30.

Further tightening of nut 34 serves to further contract the ring about the groove until a continuous circumaxial sealing line of contact is established between the ring and the groove surface 30 as shown in FIG. 3. Further attempted torquing of the nut will meet substantial resistance giving the mechanic a "poistive feel" that the fitting is properly sealed in the port.

During this contraction of the ring between the time when the split initially closes as shown in FIG. 2 and the sealed condition in the port as shown in FIG. 3, the inside diameter of the ring is reduced by at least .003 inch. This is accounted for by three substantially simultaneous occurrences: First, the opposed end faces of the ring at the split are urged into intimate sealing contact probably entirely across their area, but at least along an unbroken line extending across the faces between the lines of sealing contact of the inside and outside surfaces of the ring with the groove and beveled port surfaces respectively. Second, as the ring is pushed downwardly into the port riding the beveled surface 24 it is circumferentially shortened resulting in a diametrical contraction of the ring. This contraction accounts for the major closing of the ring about the groove surface. Third, as the ring circumferentially shortens it also increases in cross-sectional area, i.e., its cross-sectional dimensions A and B, see FIG. 7, increase. The increase in dimension B also helps in filling the space between the inner surface of the ring and the groove.

In practice, because of manufacturing tolerances on the diameter of the groove and dimensions of the ring, an average condition for a one-half inch fitting would show a .0035 inch clearance between the inside diameter of the ring and the groove at the instant of contact between the ends of the ring. This clearance is filled by the contraction of the ring as aforesaid. Because very little contraction is accounted for by circumferential shortening of the ring arising from increased tightening of the split once the split has initially closed, shortening of the ring allowed by such increased tightening of the split can be disregarded as a practical matter in explaining more completely the changes occurring in the ring during its contraction after initial closure of the split. Some increase in the cross-sectional width B and thickness A occurs during tightening of the ring in the port prior to the inside circumferential surface contacting the groove. As this increase in width and thickness will occur within the elastic limits of the preferred metals hereinafter outlined, the cross-sectional shape of the ring will be under resilient compression which tends to "recover" its original size as the fitting is loosened so that the ring does not take a permanent set, thereby contributing to its reusability.

Of importance in the design of the ring is the metal of which it is formed. I have found that very satisfactory rings may be formed of both steel and aluminum. 2024–T4, 2024–T81, and 2024–T86 aluminum alloy rings have proven satisfactory, under the following conditions: 2024–T4 has been used with success for ¾ inch and larger size fittings while 2024–T86 has been used in the ⅝ inch fittings and smaller. It is desirable to provide a stronger ring in the smaller sizes to withstand deformation resulting from tightening the fitting into the port.

Aluminum rings I have found will conform to slight irregularities in the surface of the port and groove and close in around the groove more easily than steel rings and still resist almost the same load before being permanently deformed as a steel ring. Because the aluminum ring is more resilient or more nearly perfectly elastic than a steel ring when used within reasonable limits, in many fittings the aluminum ring will provide a much better seal. This does not mean that stainless and carbon steel rings will not perform as well as aluminum, but the steel rings require greater accuracy of dimenisons in the form of the ring and the fitting and the ports, the surface finish or roughness of these parts must be more closely controlled, and the torque applied to produce the seal must be higher. Using aluminum rings of the above described character, I have formed adequate seals for ⅝ size fittings at 40 foot pounds of torque and in a ¾ size fitting at 55 to 60 foot pounds of torque. To effect a seal with steel rings of the same size will require substantially 25 percent more torque. I have found that aluminum rings will seal dependably at the lowest torque with the roughest surfaces and largest tolerances.

I have obtained satisfactory sealing results using stainless steel of types 410 and 302. Since the modulus of elasticity for such steel is from 28,000,000 p.s.i. to 29,000,000 p.s.i. it takes slightly less than three times as great a unit load to stretch, temporarily, the steel the same amount as the aluminum stretches, or the aluminum in other words deforms almost three times as much as the steel for the same unit load. While this at first may seem to be a disadvantage in the use of aluminum, it really is not. The aluminum is only slightly more deformed than the steel after the load is removed, if it has slightly exceeded the yield strength of both metals. If the yield strength of the aluminum is not exceeded then the aluminum necessarily must have deformed three times as much as the steel and yet returned to its original shape after the load was removed. As a consequence the aluminum is found to conform to slight irregularities, close in around the fitting groove more easily, and still resist almost the same load before being permanently deformed. Therefore the aluminum ring is more resilient or more nearly perfectly elastic than the steel ring when used within reasonable limits.

I prefer to use aluminum for the split rings though recognizing that steel rings are usable if greater precautions are taken with respect to accuracy of dimensions and form of the ring, the fitting body, and the port, surface finish or roughness more carefully controlled, and greater torques employed in effecting the seal.

Preferably the split ring should be formed of a metal having less than the modulus of elasticity of the fitting body and tensile strength substantially that of the fitting body. This gives a good combination of ability to seal high pressures at reasonably low sealing torques. The aluminum 2024 series type material has been found very satisfactory for the ring where the fitting body is formed of low carbon steel such as C1117.

Using the split ring having the aforementioned characteristics the ring deforms elastically during tightening into the port and will tolerate some additional stress when tightening further (after the ring has contacted the groove) to pre-load the assembly. By pre-loading the assembly to a torque which causes considerable tensile stress in the fitting, there is thus provided a delay in axial outward movement of the fitting under the influence of increasing fluid pressures until such pressure is great enough to overcome the pre-loading. During such pre-loading of the assembly, the ring deforms elastically within its elastic limit principally by an increase in its thickness, dimension A, such that when outward axial movement of the fitting and ring do occur under high fluid pressures overcoming the pre-loading, the ring contracts in dimension A seeking to return to its shape prior to the pre-loading and thereby maintains sealing contact with the groove.

The split rings shown in FIGS. 1–4, 7 and 9 may be characterized as elliptical or of oblong circular shape in cross-section, and as heretofore mentioned should have a minor to major axis ratio within the range from between .25 and 1, i.e., the minor axis can be as little as one-quarter of or up to equal the major axis.

The split ring of FIG. 8, which is designed within the same range of width to thickness ratio as above mentioned, is of irregular somewhat egg shape. It is indicated generally at 52 in FIGS. 8, 10 and 11 and is shaped to provide a curved lower end 54 adapted to enter the port first, an internal surface 60 formed on a large radius, substantially larger than the ratio of curved surface 54, an outer flat face 56 adapted to contact the beveled port entrance, a curved upper end 58 between which an internal surface 60, is a flat 62. In FIG. 10 the ring is shown in the condition it would have just as the flat 56 touches the port entrance 24 and before any appreciable tightening of the fitting. The compression face 32 of the nut is shown as bearing on the crest of curve 58 as at 59, which for clarity is shown in FIG. 8. When the fitting is tightened into the port, the ring is contracted to close the split 86 and is placed under a twisting force giving rise to a torsional stress in the ring as the upper end of the ring is forced downwardly and radially outwardly with surface 62 tending to come into flush face-to-face contact with surface 32 of the nut. This torsional stress causes the ring to tend to untwist as the fitting is urged outwardly of the port by high fluid pressures, thereby maintaining a sealing contact between the groove and port surfaces.

In FIG. 11 the ring 52 is shown in its sealed condition in the port. Surface 62, while not in flush contact with surface 32 is more nearly parallel thereto than in the FIG. 10 condition, and the ring of FIG. 11 is under a twisted tension. With port bevels of 20 degrees, 30 degrees or greater the ring will twist more with surface 62 more nearly approaching a flush face-to-face contact with the compression or back up surface 32 of the nut. Ring 52 has a compression face-engaging surface 59 (see FIG. 8) which initially engages the compression face 32 as the nut 34 is tightened; such surface 59 being at a radial distance from the axis of the ring which more closely approaches the outside diameter of the ring than the inside diameter.

In FIG. 4 a ring of the type shown in FIGS. 1–3 and 7 is shown in a fitting environment slightly different from that of FIGS. 1–3. The port member 20a is provided with an external thread 22a, the fitting body proper 26a is without threads but has a groove 30a the outer end of which is provided with a compression face 32a for urging the ring 42a into the tapered entrance 24a of the port. To make the split ring captive, the fitting body is provided at the inner end of the groove with a shoulder 28a having an inclined surface for facilitating the reception of the ring onto the groove. Threaded means in the form of a nut 90 serve to draw the fitting body and port together. The nut is provided with a shoulder 92 which engages in an annular groove 94 for locking the nut and fitting body together.

The advantage of the symmetrical rings having a cross-sectional shape of that shown in FIGS. 1–3, 7 and 9 over the ring of FIG. 8, is that the former may be entered into the port without regard to being "upside down," and may therefore be characterized as reversible. The ring of FIG. 8, on the other hand, is not reversible and lower end 54 must be entered first into the port.

What is claimed is:

1. A fluid pressure coupling for threaded attachment to a threaded member having an outwardly opening port provided with a radially outwardly beveled unthreaded entrance comprising, in combination: a fitting body having an unthreaded cylindrical portion axially receivable in the port in radial opposition to the beveled entrance and defining with the beveled entrance an annular sealing ring receiving recess with the beveled entrance of the port extending outwardly at an acute angle with respect to said unthreaded cylindrical portion from closely adjacent the same at the bottom of the recess; sealing ring backup means on the fitting at the axially outer end of said cylindrical portion and including a radially outwardly extending ring backing surface disposed at an acute angle with respect to the beveled entrance of the port for urging a sealing ring into said recess and against said beveled entrance; said fitting body at the axially inner end of the unthreaded cylindrical portion having a circumferentially extending abutment of greater diameter than the diameter of the cylindrical portion to trap on the fitting body a sealing ring encircling said cylindrical portion; means on the fitting body including a threaded portion engageable with the threaded member to attach the fitting body to the threaded member as aforesaid; a resilient metal split sealing ring having a normal internal diameter less than the diameter of said abutment and said backing surface but sufficiently oversize the diameter of said unthreaded cylindrical portion as to be freely rotatable and shiftable thereupon, said ring being stiffly resilient and radially expandable within its elastic limit ot be axially telescoped over said abutment and allowed to radially contract about the cylindrical portion of the fitting to be trapped thereupon; said ring having in cross-section a radial to axial dimension ratio valve of from between .25 and 1; said ring adapted to be urged by said backing surface downwardly into the ring-receiving recess and against the beveled entrance of the port and thereby contracted about the fitting body into fluid-tight sealing engagement with the unthreaded portion and port entrance with the split of he ring being fluid tightly closed; the internal diameter of the ring being such in relation to both the elasticity of the metal of which it is formed and the diameter of said unthreaded cylindrical portion that upon contraction of the ring about such portion by axial pressure of said backing surface urging the ring against the beveled port entrance and downwardly into the recess the split is initially non-sealingly closed without the internal circumference of the ring effecting a seal with said unthreaded cylindrical portion of the fitting, and thereafter increased axial pressure on the ring causes sealing closure of the split and an elastic deformation of the ring within its elastic limit inwardly toward the bottom of said recess causing further radial contraction about said unthreaded cylindrical portion into circumaxial sealing engagement therewith.

2. A fluid pressure coupling for threaded attachment to a threaded member having an outwardly opening port provided with an annular outwardly facing unthreaded beveled sealing seat comprising: a fitting body having an unthreaded cylindrical portion axially receivable in the port in radial opposition to the beveled sealing seat and defining with the seat an annular sealing ring receiving recess with the seat extending outwardly at an acute angle with respect to said unthreaded cylindrical portion from closely adjacent the same at the bottom of the recess; sealing ring compression means on the fitting at the outer end of said cylindrical portion and including a radially extending ring backing surface disposed at an angle with respect to the beveled entrance of the port for exerting substantially its entire force component upon a sealing ring axially of the port for urging such sealing ring into said recess and against said beveled entrance; said ring backing surface being spaced outwardly from said member and seat when the coupling is fluid tightly sealed in the port to provide an annular space therebetween; said fitting body at the axially inner end of the unthreaded cylindrical portion having a circumferentially extending abutment of greater diameter than the diameter of the cylindrical portion to trap on the fitting body a sealing ring encircling said cylindrical portion; means on the fitting body including a threaded portion engageable with the threaded member to attach the fitting body to the threaded member as aforesaid; an annular resilient metal sealing ring axially split through at one point of its circumference and having a normal internal diameter less than the diameter of said abutment and disposed in axially confronting opposition to said backing surface but sufficiently oversize the diameter of said unthreaded cylindrical portion as to be freely rotatable and shiftable thereupon, said ring having a solid cross-sectional shape of the form of an oblong circle whose major axis extends substantially parallel to the axis of the ring and whose minor axis is between one quarter of and equal to the major axis, said ring being of sufficient resiliency that it may be radially expanded within its elastic limit to be axially telescoped over said abutment and allowed to radially contract about the cylindrical portion of the fitting to be trapped thereupon; said ring adapted to be urged by said backing surface downwardly into the ring-receiving recess and against the beveled entrance of the port and thereby contracted about the fitting body into fluid-tight sealing engagement with the unthreaded portion and port entrance with the split of the ring being fluid tightly closed; the internal diameter of the ring being such in relation to both the elasticity of the metal of which it is formed and the diameter of said unthreaded cylindrical portion that upon contraction of the ring about such portion by axial pressure of said backing surface urging the ring against the beveled port entrance the split is initially non-sealingly closed without the internal circumference of the ring effecting a seal with said unthreaded cylindrical portion of the fitting, and thereafter increased axial pressure on the ring causes sealing closure of the split and an elastic deformation of the ring within its elastic limit inwardly toward the bottom of said recess to allow further radial contraction about said unthreaded cylindrical portion to effect a seal therewith.

3. A fluid pressure coupling for threaded attachment to a threaded member having an outwardly opening port provided with a radially outwardly beveled unthreaded entrance comprising, in combination: a fitting body having an unthreaded cylindrical portion axially receivable in the port in radial opposition to the beveled entrance and defining with the beveled entrance an annular sealing ring receiving recess with the beveled entrance of the port extending outwardly at an acute angle with respect to said unthreaded cylindrical portion from closely adjacent the same at the bottom of the recess; sealing ring backup means on the fitting at the axially outer end of said cylindrical portion and including a radially outwardly extending ring backing surface disposed at an acute angle with respect to the beveled entrance of the port for urging a sealing ring into said recess and against said beveled entrance; said fitting body at the axially inner end of the unthreaded cylindrical portion having a circumferentially extending abutment of greater diameter than the diameter of the cylindrical portion to trap on the fitting body a sealing ring encircling said cylindrical portion; means on the fitting body including a threaded portion engageable with the threaded member to attach the fitting body to the threaded member as aforesaid; a resilient metal split sealing ring having a normal internal diameter less than the diameter of said abutment and said backing surface but sufficiently oversize the diameter of said unthreaded cylindrical portion as to be freely rotatable and shiftable thereupon, said ring being stiffly resilient and radially expandable within its elastic limit to be axially telescoped over said abutment and allowed to radially contract about the cylindrical portion of the fitting to be trapped thereupon; said ring being of solid cross-sectional structure generally circularly oblong with the major axis being parallel to the axis of the ring, the normal inside diameter of the ring being sufficiently greater than the diameter of the unthreaded portion that upon initial closure of the split by urging of the ring toward the bottom of said recess by the backing surface of the fitting the inside circumferential surface of the ring is spaced from the surface of the unthreaded length, said ring having an elasticity capable of allowing continued radial contraction as the ring is urged further toward the bottom of the recess by said backing surface to circumaxially sealingly engage the unthreaded length, said ring having a tensile strength preventing uncontrolled extrusion of the ring outwardly of the recess between the backing surface and port entrance under fluid pressure forces shifting the fitting outwardly of the port limited distances.

4. The invention as defined in claim 3 characterized in that the outside circumferential surface of the ring opposed to the beveled port entrance is formed in cross-section on a large radius, and the inside circumferential surface of the ring opposed to the unthreaded length of the fitting is formed in cross-section on a large radius.

5. The invention as defined in claim 3 characterized in that the port is internally threaded and said abutment comprises a threaded length of the fitting engageable with the threads of the port, and the ring in unstressed condition is of helical form and is provided with an internal thread groove matching the threads of the fitting whereby the ring may be threaded over the abutment onto the unthreaded length of the fitting.

6. A fluid pressure coupling for threaded attachment to a threaded member having an outwardly opening port provided with a radially outwardly beveled unthreaded entrance comprising, in combination: a fitting body having an unthreaded cylindrical portion axially receivable in the port in radial opposition to the beveled entrance and defining with the beveled entrance an annular sealing ring receiving recess with the beveled entrance of the port extending outwardly at an acute angle with respect to said unthreaded cylindrical portion from closely adjacent the same at the bottom of the recess; sealing ring backup means on the fitting at the axially outer end of said cylindrical portion and including a radially outwardly extending ring backing surface disposed at an acute angle with respect to the beveled entrance of the port for urging a sealing ring into said recess and against said beveled entrance; said fitting body at the axially inner end of the unthreaded cylindrical portion having a circumferentially extending abutment of greater diameter than the diameter of the cylindrical portion to trap on the fitting body a sealing ring encircling said cylindrical portion; means on the fitting body including a threaded portion engageable with the threaded member to attach the fitting body to the threaded member as aforesaid; a resilient metal split sealing ring having a normal internal diameter less than the diameter of said abutment and said backing surface but sufficiently oversize the diameter of said unthreaded cylindrical portion as to be freely rotatable and shiftable thereupon, said ring being stiffly resilient and radially expandable within its elastic limit to be axially telescoped over said abutment and allowed to radially contract about the cylindrical portion of the fitting to be trapped thereupon; said ring being of solid cross-sectional structure with an axial dimension not exceeding four times its radial dimension in cross-section, and having inside and outside circumferential sealing surfaces confronting respectively the unthreaded portion of the fitting and the beveled port entrance formed on large radii of curvature, the normal inside diameter of the ring being sufficiently greater than the diameter of the unthreaded portion that upon initial closure of the split by urging of the ring toward the bottom of said recess by the backing surface of the fitting the inside circumferential surface of the ring is spaced from the surface of the unthreaded length, said ring having an elasticity capable of allowing continued radial contraction as the ring is urged further toward the bottom of the recess by said backing surface to circumaxially sealingly engage the unthreaded length, said ring having a tensile strength preventing uncontrolled extrusion of the ring outwardly of the recess between the backing surface and port entrance under fluid pressure forces shifting the fitting outwardly of the port limited distances.

7. The invention as defined in claim 6 characterized in that the ring has a backing surface engaging portion disposed radially outwardly from the axis of the ring a distance more closely approaching the outside diameter of the ring than the inside diameter whereby the ring is under a twisting tension when tightened into the port.

8. The method of effecting a fluid connection with a port having an unthreaded outwardly beveled entrance comprising: providing a tubular body member sized to be axially received in the port and extend inwardly beyond the beveled entrance with an external cylindrical surface portion opposed to the beveled port entrance and defining therewith a sealing ring receiving recess, providing a ring backing surface on the tubular body at the outer end of said cylindrical surface portion, shaping a length of metal wire to provide a cross-sectional shape adapted to fit within said recess and extend outwardly therefrom and be spaced from the bottom thereof, coiling said length of wire into a helical coil having an inside diameter greater than the unthreaded length of the tubular body member and an outside diameter fitting the recess, cutting said coil linearly parallel to its axis at one side thereof to provide a single helical ring, telescoping such ring over the tubular body, inserting the tubular body and ring into the port and urging the ring backing surface axially against the ring forcing the ring against the beveled port entrance contracting the ring to close the split and circumaxially sealingly engage the unthreaded length of the tubular body to effect a seal thereof in the port.

9. A fluid pressure coupling comprising: a first member having a passageway provided with a counterbore opening outwardly of the member, said counterbore provided with an outwardly facing annular beveled sealing seat disposed at an acute angle of from 10° to 60° with respect to the axis of the counterbore, a second member for releasable connection to the first member and having a hollow externally cylindrical smooth unthreaded portion disposed in coaxial alignment in the counterbore radially opposite said beveled sealing seat and substantially filling the counterbore but providing in cooperation therewith an annular outwardly opening sealing chamber, compression means encircling the second member at the outer end of said cylindrical portion and providing a radially extending annular sealing ring compression face disposed outwardly of the beveled sealing seat but in axial opposition to it and lying substantially between 75° to 90° with respect to the sealing seat of the port, a metal ring encircling said cylindrical portion and split through at one point of its circumference providing opposed meeting faces at the split, said ring being of solid metal cross-section with its radial dimension in cross-section being not less than about ¼ nor more than about equal its axial dimension, said ring being expansible and contractible within its elastic limits to be removed from or placed on said cylindrical portion and when substantially unstressed having an outside diameter allowing reception in the port and nesting against said beveled sealing seat, with the inside diameter spaced from the surface of said cylindrical portion by an amount substantially to be taken up upon contraction of the ring closing the split, said compression face bearing against the outer end of the ring for urging it tightly into the port and operable to urge the ring against the beveled sealing seat and cause the ring to be contracted thereby into fluid-tight embracement of said cylindrical portion and fluid-tight closure of the split with the ring in fluid-tight abutment with the beveled seat, and said ring deformable in cross-section and extensible and contractible circumaxially all within its elastic limit upon axial urging of the ring by said compression face against said beveled seat to place the ring under radial, axial and circumaxial elastic compression from which it may recover while maintaining a fluid-tight seal in the sealing chamber as fluid pressure tends to force the second member and compression means outwardly of the port.

References Cited in the file of this patent

UNITED STATES PATENTS

| | | |
|---|---|---|
| 392,931 | Prindle | Nov. 13, 1888 |
| 1,387,901 | Payne | Aug. 16, 1921 |
| 1,583,126 | Crane | May 4, 1926 |
| 1,699,591 | Jennings | Jan. 22, 1929 |
| 2,064,140 | Appleton | Dec. 15, 1936 |
| 2,347,469 | Dies | Apr. 25, 1944 |
| 2,452,275 | Woodling | Oct. 26, 1948 |
| 3,003,795 | Lyon | Oct. 10, 1961 |
| 3,079,180 | Lyon | Feb. 26, 1963 |